June 5, 1928.
L. CONSTANTIN
1,672,152
REGULATING ARRANGEMENT FOR WINDMILLS
Filed Feb. 5, 1925   2 Sheets-Sheet 1
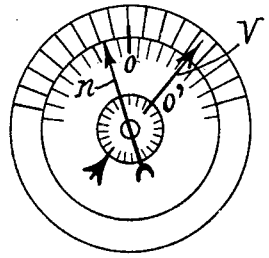
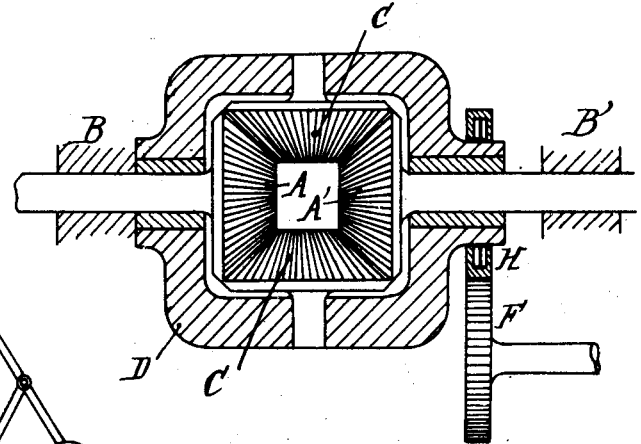
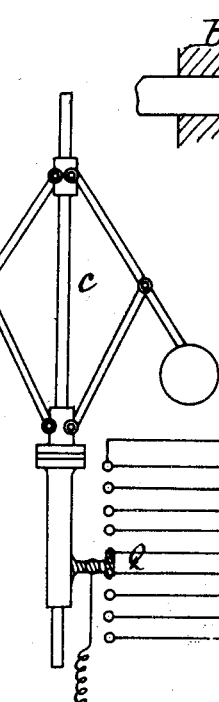
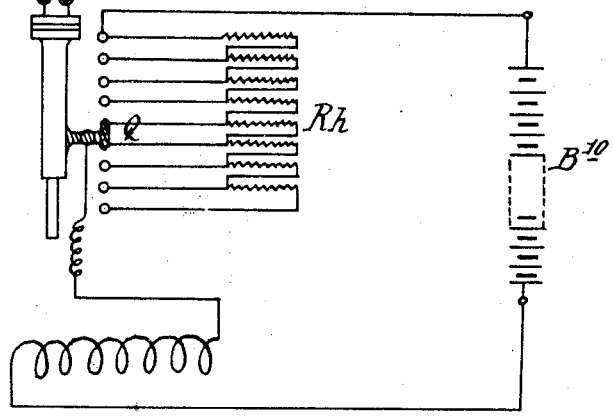
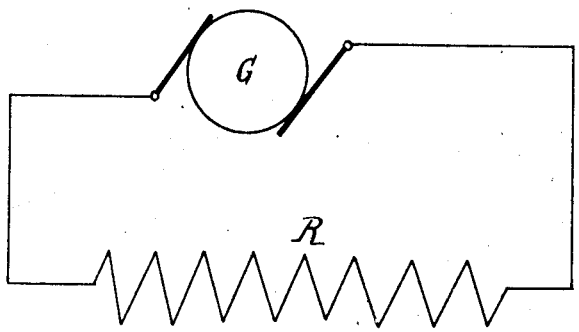
Inventor
Louis Constantin,
By [signature]
Atty.

June 5, 1928.
L. CONSTANTIN
1,672,152
REGULATING ARRANGEMENT FOR WINDMILLS
Filed Feb. 5, 1925    2 Sheets-Sheet 2
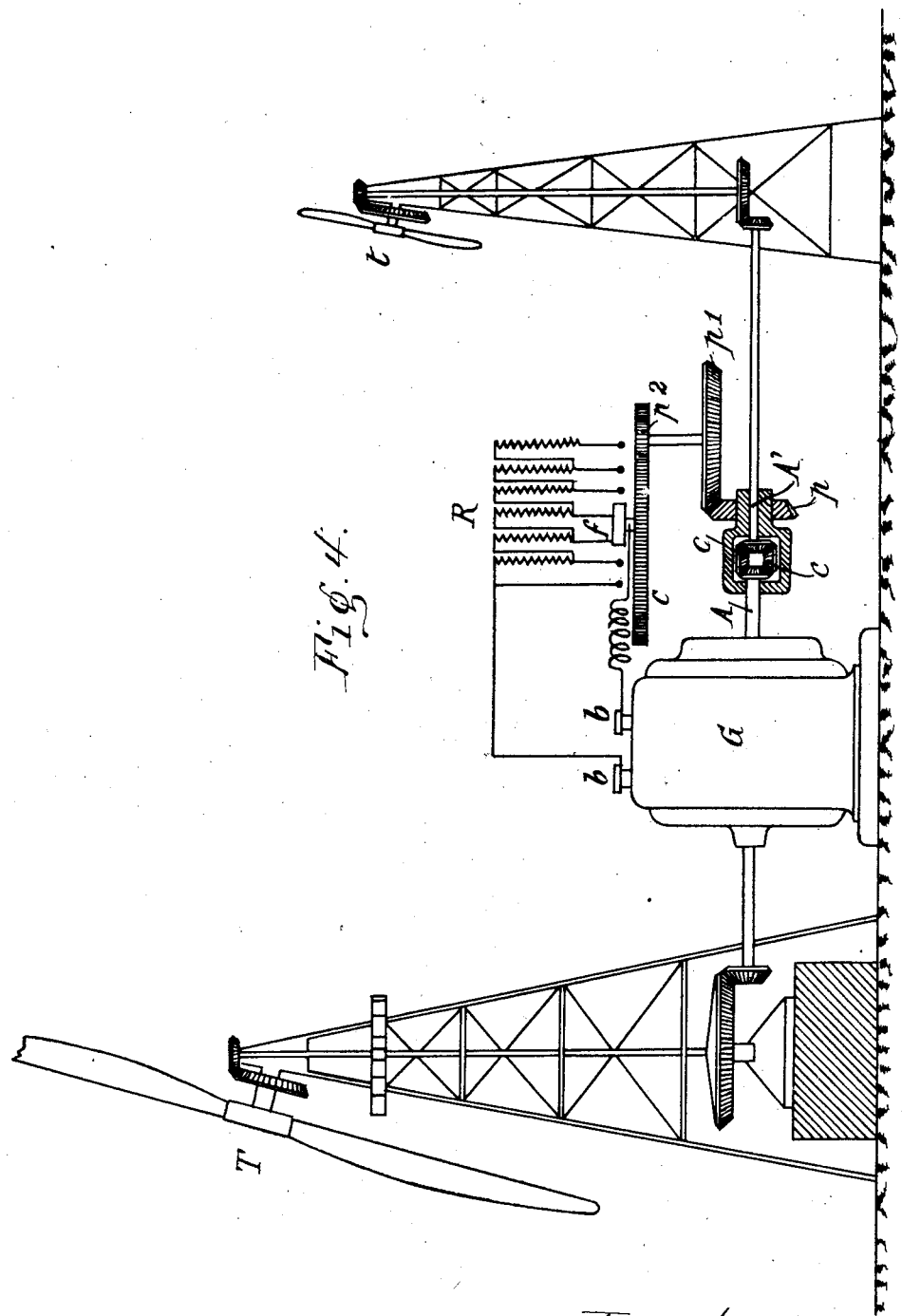
Inventor
Louis Constantin
by Henry Orth Jr.
Atty.

Patented June 5, 1928.

1,672,152

UNITED STATES PATENT OFFICE.

LOUIS CONSTANTIN, OF PARIS, FRANCE, ASSIGNOR OF ONE-HALF TO PAUL FORTIER-BEAULIEU, OF ROANNE, FRANCE.

REGULATING ARRANGEMENT FOR WINDMILLS.

Application filed February 5, 1925, Serial No. 7,126, and in France February 9, 1924.

The present invention relates to an arrangement for indicating purposes or for automatic control whereby a windmill may be operated irrespectively of the relative velocity of the wind, in certain aerodynamic conditions of a well-defined nature, such for example as conditions of maximum power or maximum aerodynamic efficiency, or otherwise of minimum effort or the like.

It is to be noted that if a windmill is considered in operation, the effort P which it exercises upon the wind will be expressed by $$P = \alpha n^2 D^4$$

and the mechanical power W which it supplies by $$W = \beta n^3 D^5$$

and further the aerodynamic efficiency will be represented by $$P = \frac{\beta}{\alpha \gamma}$$

in which $n$ is the speed of rotation of the windmill,

D its diameter $\gamma$ the value $\frac{V}{nD}$ in which V is the relative velocity of the wind, $\alpha$ and $\beta$ coefficients which depend solely upon $\gamma$.

However for a given windmill wheel, the diameter D has a determined value.

From this it will result that while the relative velocity V of the wind varies, $\alpha \beta$ and $\rho$ will not vary if care is taken to vary $n$ proportionally to V. In this manner, while maintaining the ratio $\frac{V}{n}$ constant, the windmill may be maintained irrespectively of the velocity of the wind in the desired conditions of operating, such as maximum power, maximum aerodynamic efficiency, facility of regulation, or like conditions; each of these conditions will correspond to a well-defined value of the ratio $\frac{V}{n}$.

Figure 1 illustrates a hand dial for indicating the speed regulation.

Fig. 2 illustrates an automatic mechanical regulator.

Fig. 3 is an electric regulator for the fields of a wind-driven electric generator.

Fig. 4 shows a wind-regulated mechanism for operating a rheostat in the generator field.

The indicating device for the hand regulation of the speed of the windmill wheel should therefore represent the combination of an instrument indicating this speed, with an anemometric instrument indicating the relative velocity of the wind, such as a wind wheel, Pitot tube, venturi or the like. For this purpose the simple arrangement which is shown in Fig. 1 is employed wherein the pointer $n$ is controlled by instrument indicating the speed of the windmill and the pointer V by the instrument indicating the relative velocity of the wind. The two pointers are mounted upon concentric shafts and rotate in the same direction, for instance in the clockwise direction when the speed to be indicated increases. The angle covered by each pointer for a given percentage of increase in speed is the same in all cases.

In these conditions, it is evident that if the two pointers are so mounted upon their shafts as to be superposed for certain well-defined conditions of the windmill, they will continue to be superposed irrespectively of the velocity of the wind if $\gamma$ remains the same, i. e. if the aerodynamic operating conditions remain the same. On the contrary, the angular spacing between the two pointers will indicate the magnitude and direction of the necessary corrections which are to be made.

It is preferable to provide the dial with two graduated scales having a common zero point $o$; the outer scale in the figure corresponds to the speed of the windmill; the second scale corresponds to the velocity of the wind; in this manner, the operator is enabled to read the two speeds in question and to observe the angular spacing between the pointers. Should it be desired to change the operating factor $\gamma$ i. e. to proceed for instance from the functioning at the maximum power to the functioning at the maximum efficiency, it will be obviously necessary to suitably modify the transmission means as well as the scale corresponding to the pointer $n$.

In an improved modification, a third graduated scale is herein provided which is caused to rotate with the pointer V, said scale having its movable zero point $o^1$ situated in coincidence with the pointer V, so that the position of the pointer $n$ with reference thereto will indicate the spacing angle.

Obviously, the said device may be so arranged that the three scales will be rectilinear and will be juxtaposed upon a straight line.

The said device chiefly constitutes an indicating instrument whereby the observer may execute or control suitable operations for bringing the windmill speed to the requisite value, for instance by the opening or closing of a valve, the increase or diminution of the movement of a link, or he may place electric resistances in or out of circuit or may vary the excitation of an electric generator, or like means may be employed.

If it is desired to provide for an automatic control of the functioning by means of the instrument itself, it will be feasible either to regulate a servo-motor by means of the indicating instrument or to employ the differential device which is shown in Fig. 2, which comprises two like bevel gears $A$ and $A^1$ which are disposed upon the same centre line, said gears are actuated by power transmission devices of a non-slipping nature, either mechanical or electrical, the wheel TA being driven by the windmill wheel itself and the wheel $A^1$ by a paddle wheel or air fan $t$ rotating according to the velocity $V$ of the wind. The wheel A is mounted on the shaft of the generator G the indicators of which are connected through terminals $b$, $b$ to a rheostat $R'$. Inasmuch as the said transmission devices operate without slipping, if $m$ and $m^1$ are the respective speeds of the wheels A and $A^1$, $$n\ K = m$$
$$V\ K^1 = m^1$$

wherein $n$ is the speed of the windmill and $K\ K^1$ are the coefficients of proportionality.

The said coefficients are so determined that $$\frac{K}{K^1} = \frac{V^1}{n^1}$$

$V^1$ and $n^1$ being the values of $V$ and $n$ which determine the value of $\gamma$ which is to be preserved irrespectively of all possible changes in the velocity of the wind. This affords:

$$\frac{m}{m^1} = \frac{\dfrac{V}{n^1}}{\dfrac{V}{n}}$$

so that each time that
$$m = m^1$$
i. e. each time that the wheels A and A rotate at the same speed, this will afford $$\frac{V}{n} = \frac{V^1}{n^1} = \text{a constant}$$

and inversely.

This being the case, let it be supposed that the said wheels rotate in the opposite direction and that one engages therewith a plurality of bevel gears $C$ rotatable in the stationary bearings of a member D which is shown in section in Fig. 2 and is itself rotatable on the common centre line of the wheels $A\ A^1$. To the member D is keyed in the coaxial position the spur gear H engaging a like gear wheel F.

In these conditions, each time that the speeds of A and $A^1$ are equal, the member D will cease to rotate. But if A rotates at a higher speed than $A^1$ it will actuate the member D and with it the wheels H and F at a speed proportional to the difference between the speeds of A and $A^1$. Thus if F by its rotation augments the power absorbed, for example by inserting an electric resistance, of the rheostat $R^1$ in the inductors of the generator the speed of the windmill will be reduced until A and $A^1$ again operate at equal speeds. Should $A^1$ rotate at a greater speed than A, the inverse action will take place. The automatic regulation will thus be afforded in a simple manner.

This arrangement provides for the proper operation as a general rule. When the devices in the work circuit correspond to certain conditions, it may however be simplified.

Let it be supposed for instance that the windmill drives an electric generator which supplies an electric boiler operating upon resistances; let R be the value of the said resistances and E the voltage at the terminals of the electric generator corresponding to a uniform functioning of the plant when the velocity of the wind is V.

The power employed will be $$M\ V^3 = \frac{E^2}{R}$$

M being a suitable constant.

If at a given moment the velocity of the wind becomes $K\ V$, the available power will become $M\ K^3\ V^3$, and in order that the boiler may absorb the whole of this power, the voltage at the terminals must be $E\ K^{\frac{3}{2}}$, since this affords $$M\ K^3\ V^3 = \frac{\left(E\ K^{\frac{1}{2}}\right)^2}{R}$$

It will suffice that the new speed $K\ V$ shall correspond to an excitation of the generator such that the voltage of the generators becomes $E\ K^{\frac{3}{2}}$ for a suitable speed, in order that this speed shall become automatically regulated to the value necessary to equilibrate the new load couple and that the device will operate at a uniform rate.

If R has varied according to a given formula (if for example the said resistance has been controlled by an automatic regulator acting under the influence of the wind) the rate of voltage variation at the terminals would not have been the same but it would have sufficed to ascertain its value in order to determine a priori the excitation of the generator corresponding to a stable functioning.

If therefore the devices in the work circuit are as a whole such that their operation can be determined a priori in such manner that each value of the velocity of the wind shall correspond to a stable operating position, the regulating arrangement which comprises both a manometric device and a counter of revolutions may be replaced by an arrangement comprising only one of these devices.

This modification is shown in Fig. 3, wherein R is the resistance of an electric boiler which is supplied by the generator G, it being excited by an independent source of current $B^{10}$; the ball governor $c$, which may be actuated either by the windmill which is coupled to the said generator or by a separate anemometric device, places the rheostat resistances Rh in or out of the circuit by means of the friction contact member Q; said resistances are so designed that each position of the contact member corresponds to a given excitation of the generator whereby it will possess a load couple and a speed which will exactly absorb the available power.

The equilibrium will be stable, since any increase in the speed of rotation will augment the load couple and will hence produce a braking action.

It should be noted that increasing of the wind or speeds of rotation will correspond to increasing load couples in the devices in the work circuit, in such cases the couple is proportional to the square of the speed or velocity. This principle differs essentially from what is employed with certain indicators of the centrifugal type in use with windmills whose speed they always tend to limit or to render constant.

Furthermore, the said arrangement can only be employed in the particular case in which the persons using the apparatus in the work circuit (G) are not permitted to employ the same at will, but are required to regulate the said apparatus in accordance with a formula which is accurately determined according to the velocity of the wind.

The electrical or mechanical devices may be replaced by equivalent devices without departing from the principle of the invention.

What I claim is:

A regulating arrangement for windmills comprising in combination, with a windmill wheel, a device rotating according to an instrument indicating the relative velocity of the wind, a pinion controlled through non-slipping power transmission means by the windmill wheel, a pinion controlled through like means by the said device, power transmission means acted upon by the said pinions on the differential principle and so disposed as to regulate the power required of the said windmill.

In testimony whereof I have signed this specification.

LOUIS CONSTANTIN.